United States Patent
Agrahari et al.

(10) Patent No.: US 9,624,605 B2
(45) Date of Patent: Apr. 18, 2017

(54) FILTER MATERIAL, FILTER ELEMENT, AND METHOD AND DEVICE FOR PRODUCING A FILTER MATERIAL

(71) Applicant: Mahle International GmbH, Stuttgart (DE)

(72) Inventors: Sushil Agrahari, Kanpur (IN); Rajeev Kapoor, New Delhi (IN); Mahesh Kumar, Gurgaon (IN); Puneet Singla, Faridabad (IN)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/915,078

(22) PCT Filed: Aug. 28, 2014

(86) PCT No.: PCT/EP2014/068213
§ 371 (c)(1),
(2) Date: Feb. 26, 2016

(87) PCT Pub. No.: WO2015/028530
PCT Pub. Date: Mar. 5, 2015

(65) Prior Publication Data
US 2016/0199767 A1 Jul. 14, 2016

(30) Foreign Application Priority Data

Aug. 29, 2013 (IN) ............................ 2552/DEL/2013
Oct. 21, 2013 (DE) ........................ 10 2013 221 341

(51) Int. Cl.
*B01D 39/18* (2006.01)
*B01D 46/00* (2006.01)
(Continued)

(52) U.S. Cl.
CPC ......... *D01D 5/0084* (2013.01); *B01D 29/012* (2013.01); *B01D 29/016* (2013.01);
(Continued)

(58) Field of Classification Search
CPC B01D 39/1607; B01D 39/18; B01D 46/0001; B01D 46/521; B01D 29/012; B01D 29/016; D01D 5/0084
See application file for complete search history.

(56) References Cited

U.S. PATENT DOCUMENTS 4,144,553 A 3/1979 Schmidt et al.
5,350,443 A * 9/1994 von Blucher ........ B01D 39/083
55/524

(Continued)

FOREIGN PATENT DOCUMENTS

DE 20207663 U1 9/2002
DE 102008035934 A1 2/2009
(Continued)

OTHER PUBLICATIONS

International Search Report for WO2015/028530, dated Mar. 5, 2015.
English Abstract for DE-102008035934-A1.

*Primary Examiner* — Jason M Greene
(74) *Attorney, Agent, or Firm* — Fishman Stewart PLLC

(57) ABSTRACT

A multi-layered, web-shaped filter material for a filter element may include a fleece layer, a cellulose layer, and a nanofiber layer arranged between the fleece layer and the cellulose layer. The nanofiber layer may be a coating of a nanofiber material disposed on the fleece layer. The cellulose layer may have an impregnation at least on a side facing the nanofiber layer.

20 Claims, 3 Drawing Sheets

(51) Int. Cl.
  *B01D 46/10* (2006.01)
  *B01D 46/52* (2006.01)
  *B01D 39/16* (2006.01)
  *B01D 29/01* (2006.01)
  *D01D 5/00* (2006.01)

(52) U.S. Cl.
  CPC ....... *B01D 29/018* (2013.01); *B01D 39/1607* (2013.01); *B01D 39/18* (2013.01); *B01D 46/0001* (2013.01); *B01D 46/106* (2013.01); *B01D 46/521* (2013.01); *B01D 2239/025* (2013.01); *B01D 2239/0464* (2013.01); *B01D 2239/065* (2013.01); *B01D 2239/0681* (2013.01); *D01D 5/0069* (2013.01)

(56) References Cited

U.S. PATENT DOCUMENTS

| | | | |
|---|---|---|---|
| 5,993,501 A | 11/1999 | Cusick et al. | |
| 2005/0217625 A1* | 10/2005 | Niaken | F02M 35/04 123/184.21 |
| 2005/0235619 A1 | 10/2005 | Heinz et al. | |
| 2006/0137318 A1* | 6/2006 | Lim | B01D 39/1615 55/528 |
| 2009/0032475 A1* | 2/2009 | Ferrer | B01D 46/546 210/799 |
| 2009/0126333 A1* | 5/2009 | Green | D01D 5/0084 57/402 |
| 2009/0272084 A1 | 11/2009 | Healey et al. | |
| 2010/0215939 A1* | 8/2010 | Westbroek | D01D 5/0061 428/292.1 |
| 2011/0064928 A1* | 3/2011 | Bonneh | B01D 39/1623 428/212 |
| 2011/0253645 A1 | 10/2011 | Hassmann et al. | |
| 2012/0137885 A1* | 6/2012 | Dullaert | B01D 39/1623 96/12 |
| 2015/0013285 A1* | 1/2015 | Disson | B01D 39/163 55/486 |

FOREIGN PATENT DOCUMENTS

| | | |
|---|---|---|
| DE | 202010009671 U1 | 10/2010 |
| EP | 1059106 A2 | 12/2000 |
| EP | 1366791 A1 | 12/2003 |
| WO | WO-2004069378 A2 | 8/2004 |
| WO | WO-2005/024101 A1 | 3/2005 |
| WO | WO-2007054039 A1 | 5/2007 |
| WO | WO-2008142023 A2 | 11/2008 |
| WO | WO-2009010020 A2 | 1/2009 |
| WO | WO-2009136395 A1 | 11/2009 |
| WO | WO-2010009043 A2 | 1/2010 |
| WO | WO-2011015439 A1 | 2/2011 |
| WO | WO-2011047966 A1 | 4/2011 |
| WO | WO-2011151314 A1 | 12/2011 |
| WO | WO-2013068436 A1 | 5/2013 |

* cited by examiner

FILTER MATERIAL, FILTER ELEMENT, AND METHOD AND DEVICE FOR PRODUCING A FILTER MATERIAL

CROSS-REFERENCE TO RELATED APPLICATIONS

This application claims priority to India Patent Application No. 2552/DEL/2013, filed Aug. 29, 2013, German Patent Application No. 10 2013 221 341.7, filed Oct. 21, 2013, and International Patent Application No. PCT/EP2014/068213, filed Aug. 28, 2014, all of which are hereby incorporated by reference in their entirety.

TECHNICAL FIELD

The present invention relates to a multi-layered, web-shaped filter material for filter elements for the filtration of gases and/or liquids. The invention additionally relates to a filter element which is produced by means of such a filter material. Finally, the present invention relates to a method and a device for producing such a filter material.

BACKGROUND

Filtration tasks exist in many technical areas. Of particular importance within the scope of the present application are vehicle applications, i.e. filtration tasks on or in vehicles, such as for example in an air filter, a fuel filter, an oil filter.

In a filter or a filter device, filter elements are employed which each comprise at least one filter body. Here, the filter body is preferably produced from a web-shaped filter material, which for forming the filter body is folded or pleated. Multi-layered filter materials are known in principle for an efficient filtration and long service lives. For realising high degrees of separation for small and smallest contaminations, nanofilters are additionally known. In filtration there exists the general problem that with increasing degree of filtration a flow resistance of the filter material increases as well. If for example a particularly high degree of filtration is aimed at in particular in connection with a nanostructure, a very high flow resistance is generally obtained for the associated filter material. High flow resistances however are disadvantageous since on the one hand they mechanically load the filter element and on the other hand require an adapted periphery if applicable, such as for example increased rates of delivery of pumps and intensified sealing measures.

Filter materials are known for example from U.S. Pat. No. 5,993,501 A, DE 10 2007 027 299 B4, WO 2013/068436 A1 and EP 1 366 791 A1.

SUMMARY

The present invention deals with the problem of stating an improved embodiment for a filter material or for a filter element or for a production method and for a production device, which is characterized in particular by a high degree of filtration with comparatively low flow resistance.

According to the invention, this problem is solved through the subjects of the independent claims. Advantageous embodiments are subject of the dependent claims.

The invention is based on the general idea of designing the filter material at least in three layers and accordingly equip said filter material with at least one fleece layer, one nanofibre layer and one cellulose layer. Here, the nanofibre layer is arranged between the fleece layer and the cellulose layer. To this end, the nanofibre layer is formed by coating the fleece layer with nanofibres. In addition, the cellulose layer is glued to the nanofibre layer by means of an adhesive. Because of this, a fixed bond is realised between the three individual layers since the nanofibre layer is connected in a fixed manner both to the fleece layer as well as to the cellulose layer. It has been shown that the multi-layered filter material thus formed can be subjected to a comparatively linear through-flow of the medium to be cleaned, which is attributed to the fixed connection of the individual layers among themselves. In the case of layers loosely abutting one another a shear flow can be frequently observed, which is orientated also parallel to the plane of the respective layer. Such shear flows are largely avoided with the filter material introduced here, so that the individual layers are largely subjected to a throughflow transversely to their plane, i.e. substantially only in their thickness direction. Because of this, the flow resistance can be significantly reduced.

According to an advantageous embodiment, the cellulose layer can be provided with an impregnation at least on a side facing the nanofibre layer. Through this impregnation it is achieved that the adhesive can establish a fixed connection between the nanofibre layer and the cellulose layer, but cannot penetrate the cellulose layer so far that it clogs the pores of the cellulose layer through this.

According to a practical further development, the impregnation can be matched through the adhesive in such a manner that the impregnation specifically prevents or at least impedes the adhesive penetrating the cellulose layer.

According to another advantageous embodiment, the adhesive can be produced on a water base. Such adhesives are characterized by a relatively high environmental compatibility. In particular, a recycling of the filter material can also be simplified through this.

In another advantageous embodiment it can be provided to produce the impregnation on a silicone base or form the impregnation through silicone. Such an impregnation has a highly hydrophobic effect and because of this can impede a wetting of the cellulose layer with water or with a water-base adhesive.

In another advantageous embodiment, the nanofibre layer can have an increasing fibre thickness in a thickness direction of the filter material and/or an increase fibre density. It has been shown that such an embodiment can also lead to a reduced flow resistance, wherein a high degree of filtration can be realised at the same time. The fibre thickness and the fibre density significantly influence the degree of filtration and the flow resistance. Through the gradation of the fibre thickness and/or of the fibre density, the filtration effect is thus also gradated. This results in that coarse contaminations are held back in a region of low filtration while smaller contaminations can penetrate the filter material more deeply and are retained therein in a region with a higher degree of filtration. Compared with a conventional filter material, whose nanofibres are produced continuously in the thickness direction with respect to fibre thickness and fibre density, a reduced flow resistance can be realised through the proposed gradation with the same degree of filtration. This is explained through the fact that with a conventional nanofibre structure both the coarse as well as the small contaminations are already separated outside on the nanofibre structure.

According to an advantageous further development, the fibre thickness and/or the fibre density can increase steplessly, preferentially evenly or in steps in the thickness direction of the filter material. Additionally or alternatively it can be provided that the fibre thickness and/or the fibre density increases from the fleece layer towards the cellulose layer. Practically, the fibre thickness within the nanofibre layer can vary from 100 nm to 800 nm.

A filter element according to the invention for filtering gases and/or liquids comprises at least one filter body, which during the operation of the filter element is subjected to a through-flow of gas and/or liquid, wherein the respective filter body comprises a filter material of the type described above.

To enlarge the filter area through which a flow can flow, the filter material can be practically pleated, i.e. folded.

According to another embodiment, the filter element can be a ring filter element with a ring-shaped filter body or a plate filter element with a plate-shaped filter body.

A production method according to the invention, with which a multi-layered, web-shaped filter material, in particular of the type described above can be produced is characterized in that a web-shaped fleece layer is coated with nanofibres on one side in order to directly create a nanofibre layer on the fleece layer. Furthermore, an adhesive is applied onto a cellulose layer at least on one side. Finally, the cellulose layer and the fleece layer are brought together in such a manner that the adhesive connects the cellulose layer to the nanofibre layer. Here, too, it can be optionally provided in principle that the cellulose layer is provided with an impregnation at least on one side prior to applying the adhesive.

According to an advantageous embodiment, the nanofibres can be electrostatically applied onto the fleece layer in a coating station, wherein in a fibre dispensing device of this coating station there is a spacing between the liquid fibre material and the fleece layer. There is thus no direct contacting between the fleece layer and the liquid fibre material. In particular there is no immersing of the fleece layer in the liquid fibre material. The fleece layer is rather guided past the liquid fibre material in a spaced manner. By means of electrostatic charging, ion currents can be generated between the liquid fibre material, which transport the fibre material by way of molecules onto the fleece layer. In order for the molecules of the fibre material to better detach from the liquid fibre material and can reach the fleece layer via the ion flow it is practical within the fibre dispensing device to create a linear or pot-shaped surface for the liquid fibre material in order to be able to generate high electrostatic voltages there. This can be carried out for example in that a roll on its bottom side dips into the liquid fibre material and at its top side faces the fleece layer. However, particularly advantageous is an embodiment, in which the fibre dispensing device is formed by a kind of conveyor belt, which comprises a plurality of rod-shaped dispensing elements, which in the movement direction of the conveyor belt are arranged one after the other and which in the movement direction of the conveyor belt are spaced from one another. On its bottom side the conveyor belt dips into the liquid fibre material and faces the fleece layer on its top side. The rod-shape dispensing elements are immersed in the fibre material through the movement of the conveyor belt and in the process are saturated with fibre material which it is then able to dispense to the fleece layer on the other side via a linear or dot-shaped dispensing zone with the help of the electrostatic charge or with the help of the ion currents.

According to an advantageous further development, the spacing can increase or decrease in the movement direction of the fleece layer. It has been shown, that the spacing between fleece layer and the respective surface or respectively zone dispensing the fibre material, which is preferably configured linearly or in a dot-shaped manner, is decisive for the fibre thickness and/or fibre density that can be realised.

By changing the spacing in the movement direction, the fibre thickness and/or the fibre density can thus be influenced.

In another embodiment, the fleece layer can be moved past with an inclination relative to a horizontal and flat surface of the fibre material. Because of this, a continuously decreasing or continuously increasing spacing between fleece layer and fibre material is achieved. For adjusting the spacings, optionally provision can be made that an inclination of the fleece layer is able to be adjusted with respect to a horizontal plane.

In another embodiment, a plurality of fibre dispensing devices can be provided in the movement direction of the fleece layer one after the other, in which there are different spacings between the fibre material and the fleece layer. Here, each individual fibre dispensing device can be configured in principle as a conveyor belt according to the type described above. The individual fibre dispensing devices can be optionally vertically adjustable here, in order to be able to adjust the spacings.

The fleece layer can also be described as "non-woven" or as "blow-melt".

A device according to the invention for producing a filter material, in particular of the type described above, comprises at least one fibre dispensing device, which has a conveyor belt with at least two rolls and a tub which is able to be filled with liquid fibre material, into which the conveyor belt dips at least on a bottom side, at least two deflection rollers for guiding a fleece layer above the fibre dispensing device and spaced apart from a top side of the conveyor belt and an ionising device for generating different electrical potentials on the fleece layer and on the fibre dispensing device, such that in the operation of the device, liquid fibre material is transported electrostatically from the conveyor belt to the fleece layer. It has been found that with such a device a nanofibre layer can be applied particularly simply and with reproducible parameters such as density and thickness onto the fleece layer.

According to an advantageous embodiment, the device can be configured so that a spacing between the fleece layer and the respective top side of the conveyor belt varies in the direction of movement of the fleece layer. Hereby, a graduated coating, i.e. a coating with a density varying in the thickness direction, can be applied onto the fleece layer.

Advantageously, said spacing can be adjusted e.g. in that at least one of the deflection rollers is arranged so as to be vertically adjustable. Additionally or alternatively, provision can be made that at least one such fibre dispensing device is arranged so as to be vertically adjustable.

A varying spacing can also be realized in that the rolls are arranged so that the top side of the conveyor belt runs in an inclined manner with respect to a horizontal plane. For this, the rolls can have different diameters and/or can be arranged at different levels, so that they dip into the tub at different depths.

Further important features and advantages of the invention are obtained from the subclaims, from the drawings and from the associated figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

DETAILED DESCRIPTION

Figure 1:
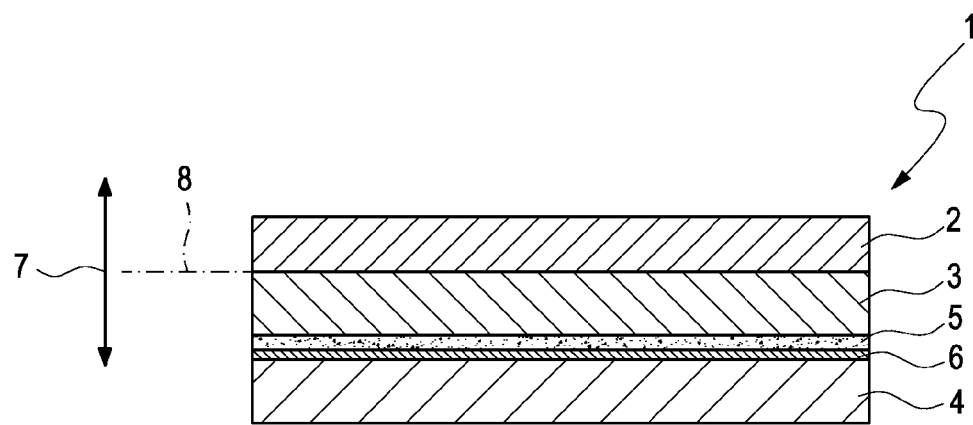
FIG. 1 a greatly simplified sectional view of a filter material.
Figure 2:
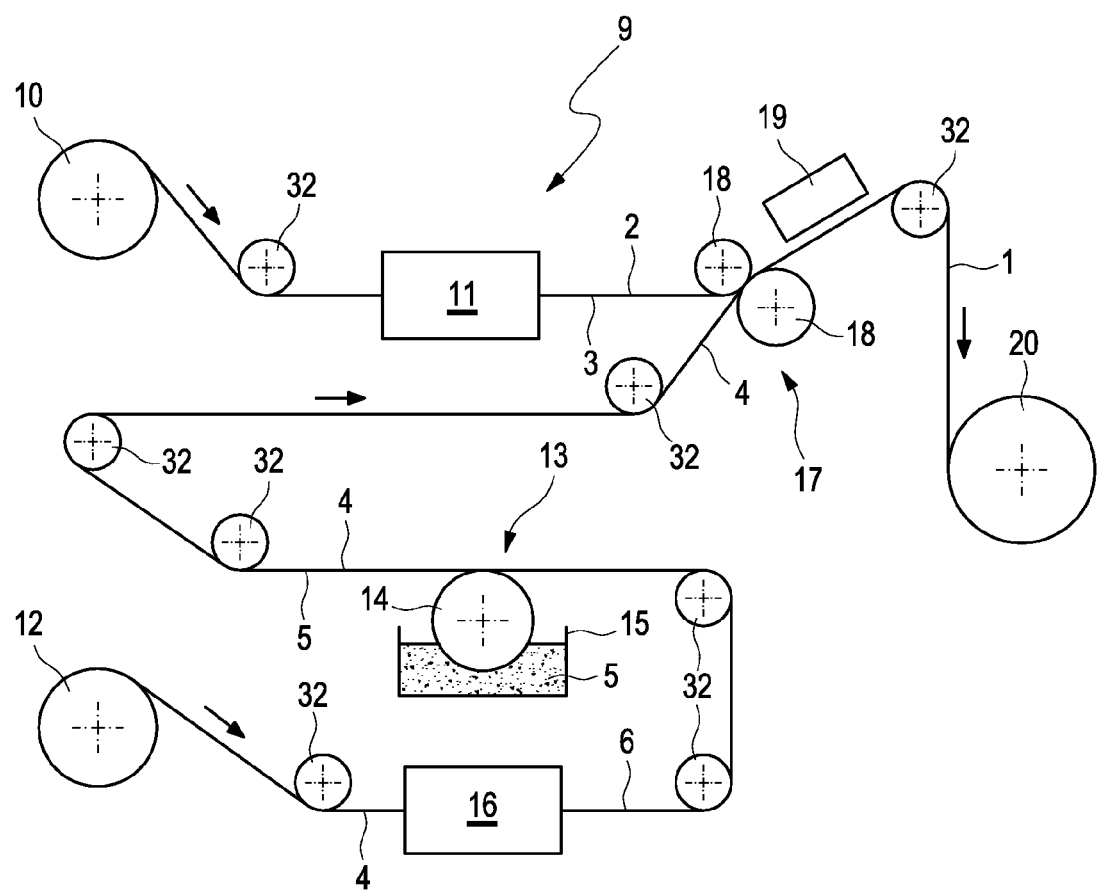
FIG. 2 a greatly simplified schematic diagram of a device for producing filter material, FIG. 3 a greatly simplified schematic diagram of a coating station, FIGS. 4 to 6 each illustrate a schematic diagram of a coating station as in FIG. 3, however with views showing other examples of the coating station.

According to FIG. 1, a multi-layered, web-shaped filter material 1, which is suitable for producing filter elements and for filtering gases and/or liquids, comprises an at least three-layered structure, so that the filter material 1 comprises a fleece layer 2, a nanofibre layer 3 and a cellulose layer 4. Here, the nanofibre layer 3 is arranged between the fleece layer 2 and the cellulose layer 4. The nanofibre layer 3 is preferably formed in that a coating of nanofibres is applied onto the fleece layer 2. Because of this, the nanofibre layer 3 is connected to the fleece layer 2 in a fixed manner. The cellulose layer 4 is glued onto the nanofibre layer 3 by means of an adhesive 5, i.e. likewise connected to the nanofibre layer 3 in a fixed manner. Practically, the cellulose layer 4 is provided with an impregnation 6 on a side facing the nanofibre layer 3. Thus, the gluing of the nanofibre layer 3 to the cellulose layer 4 by means of the adhesive 5 takes place indirectly, namely by way of the impregnation 6.

The impregnation 6 is matched to the adhesive 5 in such a manner that the impregnation 6 prevents or at least impedes an entering of the non-dried or non-cured adhesive 5 which is usually applied in liquid form penetrating the cellulose layer 4. For example, the adhesive 5 is produced on a water base so that it solidifies in particular through drying. The impregnation 6 is then practically produced on a silicone base or directly formed through silicone.

In a thickness direction 7 indicated by an arrow in FIG. 1, which extends transversely to a web plane 8, in which the filter material 1 lies, the nanofibre layer 3 has an increasing fibre thickness and an increasing fibre density. As a rule, an increasing fibre thickness simultaneously leads to an increasing fibre density, which on its part is accompanied by a reduction of the pore size of the nanofibre layer 3 and thus by an increased filtration effect. An embodiment, in which the fibre thickness increases while the fibre density substantially remains constant or in which the fibre density increases while the fibre thickness substantially remains constant is also conceivable.

The fibre thickness and/or the fibre density can increase in the thickness direction 7 of the filter material 1 steplessly or in steps. With a stepless increase, an even or linear increase can be preferred. With a step increase, two or more steps are conceivable.

Preferentially, the fibre thickness or the fibre density increases from the fleece layer 2 in the direction of the cellulose layer 4. I.e., in this case, against the thickness direction 7 according to FIG. 1. A preferred flow direction of the filter material 1 then corresponds to the direction in which the fibre thickness or the fibre density also increases.

Accordingly, a preferred flow direction of the filter material 1 is directed against the thickness direction 7.

With the help of the filter material 1 shown here, a filter element which is not shown here can be produced, which serves for the filtering of gases and/or liquids and serves for filtering out solid contaminations. To this end, the respective filter element comprises at least one filter body which is produced with the help of such a filter material 1. During the operation of the filter element, this filter body is subjected to the throughflow of the fluid to be cleaned. Practically, the filter material 1 in the filter body is pleated, i.e. folded zig-zag-shaped. In preferred embodiments, the filter element is a ring filter element which is characterized by a ring-shaped filter body, or a plate filter element, which is characterized by a plate-shaped, in particular flat filter body.

In the following, a method for producing a multi-layered, web-shaped filter material 1 is described by means of FIGS. 2 to 6, wherein an associated device 9 is reproduced in a greatly simplified manner.

Within the scope of the production method, a web-shaped fleece layer 2 is coated on one side with nanofibres, as a result of which a nanofibre layer 3 is generated directly on the fleece layer 2. To this end, the fleece layer 2 is reeled from a fleece layer reel 10, which quasi continuously provides the fleece layer 2. In a coating station 11, the one-sided coating of the fleece layer 2 with nanofibres takes place in order to form the nanofibre layer 3 thereon. In FIGS. 2 to 6, the nanofibre layer 3 is generated in each case on the bottom side of the fleece layer 2.

Furthermore, an adhesive 5 is applied onto a web-shaped cellulose layer 4 in the device 9. To this end, the cellulose layer 4 is unreeled from a cellulose layer reel 12, which quasi continuously provides the cellulose layer 4. In an adhesive application station 13, the adhesive 5 is applied onto a side of the cellulose layer 4. Purely exemplarily, this can take place by means of a transfer roll 14, which at the bottom dips into a tub 15 filled with adhesive 5 and on its top side transfers the adhesive 5 onto the cellulose layer 4.

Practically, the cellulose layer 4 is impregnated prior to applying the adhesive 5. This is carried out in an impregnating station 16, which in a suitable manner provides the cellulose layer 4 with an impregnation 6 at least on the side provided with the adhesive 5. Applying the impregnation 6 can be carried out by dipping the cellulose layer 4 into an impregnating agent bath or by spraying on the impregnating agent.

In a connecting station 17, the fleece layer 2 and the cellulose layer 4 are brought together in such a manner that the adhesive 5 connects the cellulose layer 4 to the nanofibre layer 3. The connecting station 17 in this case is reproduced in a simplified form through two rolls 18, between which the individual layers 2, 3, 4 are guided through, so that the two rolls 18 roll off on each other by way of these layers 2, 3, 4. After the connecting station 17, a heating station 19 can be arranged, which ensures a hardening or drying of the adhesive 5. Following this, the three-layered filter material 1 can be wound onto a filter material reel 20, which stores the web-shaped filter material 1 in a quasi continuous manner.

According to FIGS. 3 to 6, the coating station 11 can apply the nanofibres onto the fleece layer 2 electrostatically. To this end, the fleece layer 2 is guided past spaced from the liquid fibre material 21, which to this end is provided in at least one fibre dispensing device 22 of the coating station 11. In the embodiment shown in FIG. 3, only one such fibre dispensing device 22 is provided.

Figure 4:
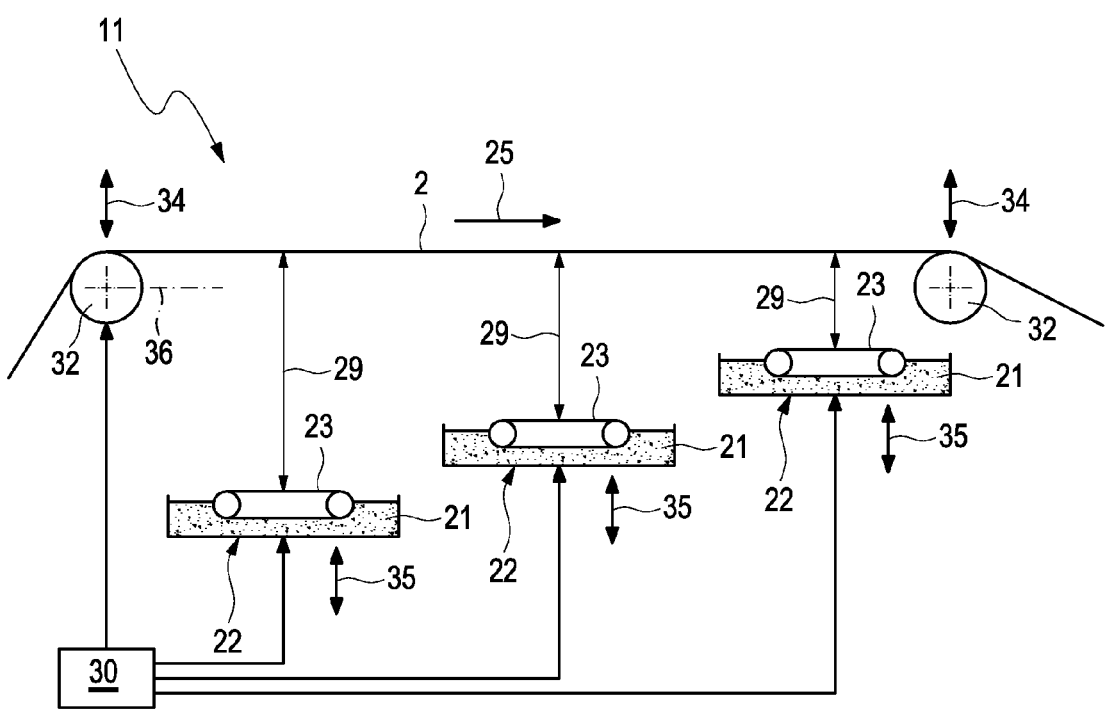
Figure 5:
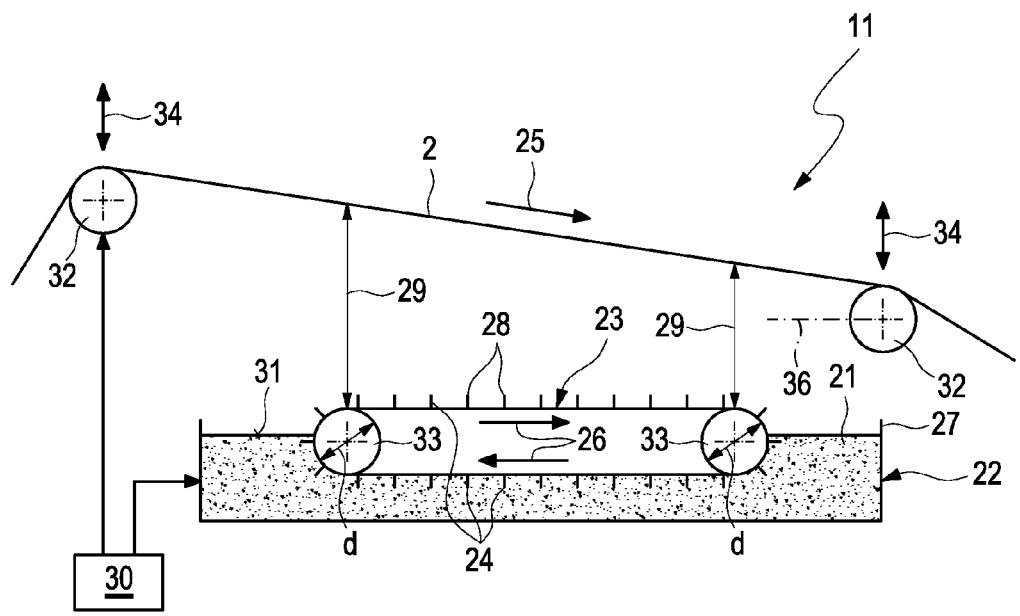
Figure 6:
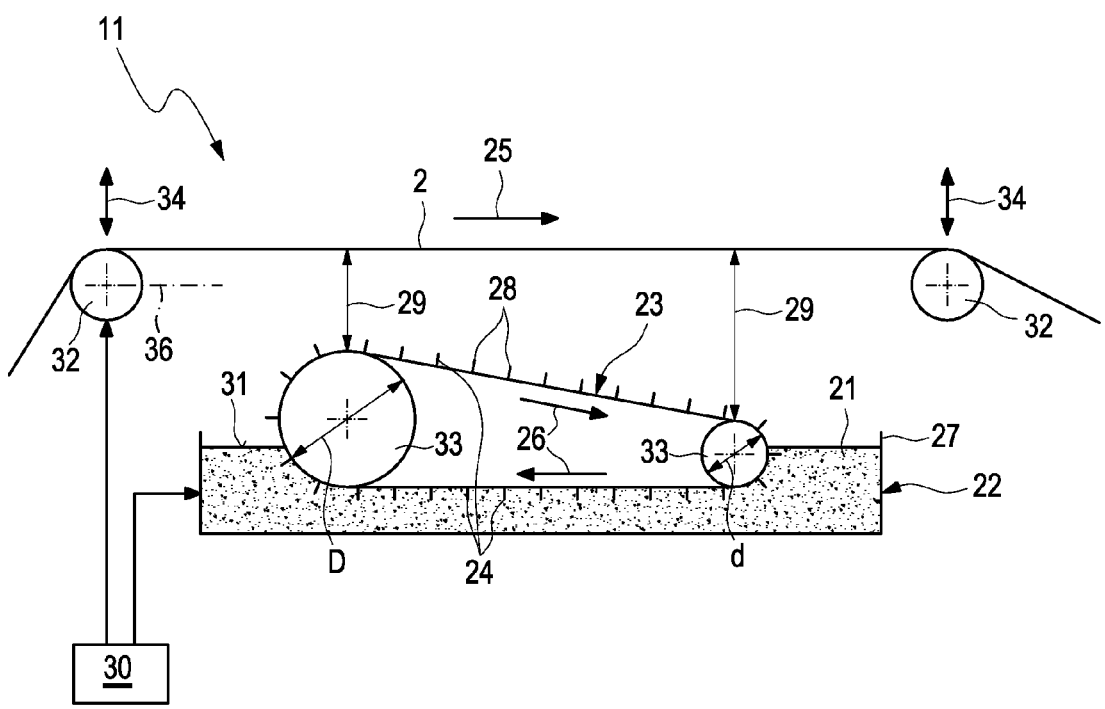

In the embodiment shown in FIG. 4, three such fibre dispensing devices 22 are provided purely exemplarily. In FIGS. 5 and 6, on the other hand, respectively again only one fibre dispensing device 22 is provided.

Here, the respective fibre dispensing device 22 is realised with the help of a conveyor belt 23, which comprises a plurality of linear, rod-shaped or web-shaped dispensing elements 24. The dispensing elements 24 practically extend over the entire width of the respective fleece layer 2 and in the process extend transversely to a movement direction 25 of the fleece layer 2. The dispensing elements 24 in this case also extends transversely to a movement direction 26 of the conveyor belt 23. The conveyor belt 23 is arranged so that it dips into a tub 27 with its bottom side, in which tub the liquid fibre material 21 is stored. Because of this, the dispensing elements 24 are dipped into the liquid fibre material 21. On its top side, the conveyor belt 23 moves outside the liquid fibre material 21 and faces the fleece layer 2. The dispensing elements 24 practically define linear dispensing zones 28, which face the fleece layer 2 and which are spaced from the fleece layer 2. A corresponding spacing is drawn into FIGS. 3 to 6 and designated 29. The dispensing elements 24 can comprise a plurality of needle-shaped elevations (not shown) transversely to the movement direction 26 of the conveyor belt 23, as a result of which dot-shaped dispensing zones 28 can be realised.

Figure 3:
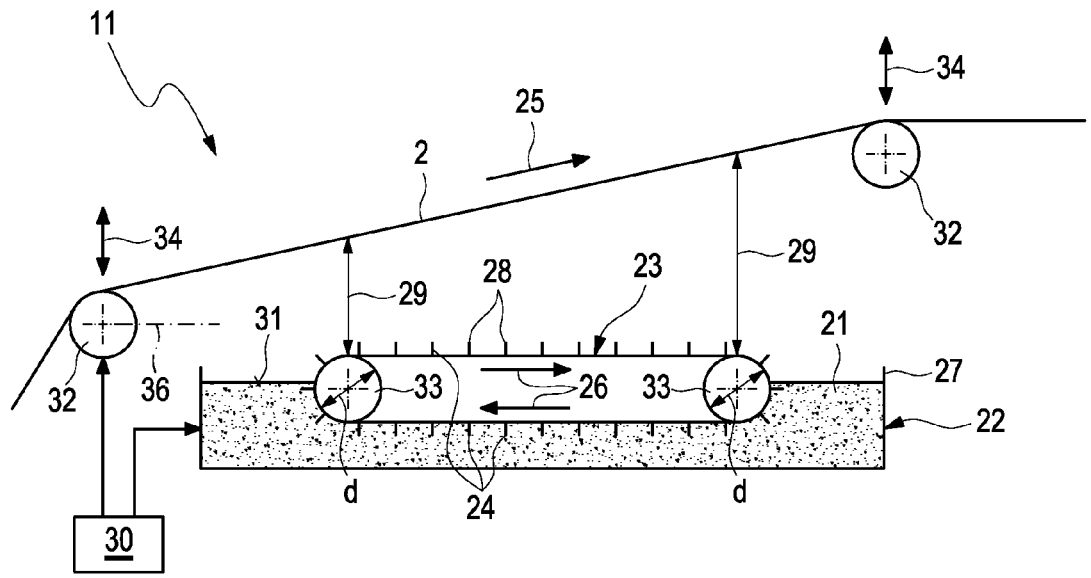

The conveyor belt 23 is stretched out and driven by means of at least two rolls 33. In the example of FIG. 3, the rolls 33 have the same diameter d, so that the top side and bottom side of the conveyor belt 23, moving against each other, extend parallel to one another. In the example of FIG. 3, the rotation axes of the two rolls 33 are arranged in a common plane, which extends horizontally, Therefore, the top side and the bottom side of the conveyor belt 23 run horizontally here.

With the help of an ionising device 30, different electric potentials can be generated on the fleece layer 2 and on the fibre dispensing device 22, as a result of which an electrostatic charge is realised, which finally results in an ion current, which discharges molecules of the fibre material 21 from the dispensing zones 28, transports these in the direction of the fleece layer 2 and causes these to adhere to the fleece layer 2.

In the embodiment shown in FIG. 3, the previously mentioned spacing 29 between the fleece layer 2 and the dispensing zones 28 increases in the movement direction 25 of the fleece layer 2, namely continuously. In contrast with this, FIG. 4 shows an embodiment, in which the spacing 29 between the fleece layer 2 and the respective dispensing zone 28 decreases in the movement direction 25 of the fleece layer 2, namely in steps.

In FIG. 3, the fleece layer 2 is inclined relative to a horizontal and flat surface 31 of the liquid fibre material 21 in such a manner that said spacing 29 increases in the movement direction 25 of the fleece layer 2. In contrast with this, a plurality of fibre dispensing devices 22 are provided in the embodiment shown in FIG. 4, namely purely exemplarily three fibre dispensing devices 22. The fibre dispensing devices 22 are arranged one after the other in the movement direction 25 of the fleece layer 2 and differ from one another through different spatial heights, whereby different spacings 29 relative to the fleece layer 2 arise. Each fibre dispensing device 22 comprises a conveyor belt 23 of the type described with reference to FIG. 3, wherein these conveyor belts 23 however are represented simplified in FIG. 4; in particular, the individual dispensing elements 24 as well as their dispensing zones 28 are not shown. As can be seen, the spacing 29 in the movement direction 25 of the fleece layer 2 decreases from one fibre dispensing device 22 to the next.

In FIGS. 2 to 6, a plurality of deflection rollers 32 are additionally indicated, which deflect or align the fleece layer 2 or the cellulose layer 4 or the filter material 1. A front deflection roller 32, overtravelled first by the fleece layer 2, which deflection roller is illustrated on the left in FIGS. 3 to 6, and a rear deflection roller 32, overtravelled last by the fleece layer 2, which deflection roller is illustrated on the right in FIGS. 3 to 6, can be seen. In FIG. 3, the two deflection rollers 32 have different levels. The front deflection roller 32 is arranged deeper here than the rear deflection roller 32, so that the fleece layer 2 rises in its direction of movement.

In the example of FIG. 4, on the other hand, the two deflection rollers 32 have the same level, so that the fleece layer 2 extends horizontally between the deflection rollers 32.

Double arrows 34 in the case of the deflection rollers 32 indicate that optionally at least one of the deflection rollers 32 can be arranged adjustably with regard to its vertical spacing from the fibre dispensing device 22. Preferably, the vertical spacing measured perpendicularly to the horizontal, can be adjusted separately in the two deflection rollers 32. The vertical adjustability of at least one such deflection roller 32 allows an inclination to be adjusted, which the fleece layer 2 has between the deflection rollers 32 with respect to a horizontal plane 36, which is indicated in FIGS. 3 to 6 respectively by a dot-and-dash line. Through the vertical adjustability of at least one of the deflection rollers 32 also the spacings 29 between the dispensing zones 28 and the fleece layer 2 can be adjusted, in order to optimize the coating process.

In the embodiment shown in FIG. 4, optionally provision can also be made that at least one of the deflection rollers 32 is arranged vertically adjustably according to the double arrows 34. Additionally or alternatively, provision can be made that at least one of the fibre dispensing devices 22 is arranged vertically adjustably according to double arrows 35. In this way, also, the spacings 29 between the dispensing zones 28 and the fleece layer 2 can be adjusted.

FIG. 5 shows an embodiment analogous to FIG. 3, in which, however, the levels of the deflection rollers 32 are inverted. Accordingly, here, the front deflection roller 32 is arranged higher than the rear deflection roller 32. Therefore, a slope results here for the fleece layer 2 in its movement direction 25. Consequently, the spacings 29 between the dispensing zones 28 and the fleece layer 2 decrease in the movement direction 25 thereof.

In the embodiment shown in FIG. 6, the two deflection rollers 32 are set again at identical heights. In this case, an increase of the spacings 29 between the dispensing zones 28 and the fleece layer 2 in the movement direction 25 thereof is achieved in that the rolls 33 of the conveyor belt 23 have different diameters d and D. In the example of FIG. 6, the diameter D of the left-hand roll 33 is distinctly greater than the diameter d of the right-hand roll 33. At the same time, the rolls 33 are arranged here so that the bottom side of the conveyor belt 23 within the fibre material 21 runs approximately horizontally. Consequently, the top side has a slope in the movement direction 25 of the fleece layer 2.

It is clear that the variants presented here in connection with FIGS. 3 to 6 for adjusting a varying spacing 29 between the dispensing zones 28 and the fleece layer 2 are also able to be combined with one another as desired.

The invention claimed is:

1. A multi-layered, web-shaped filter material for a filter element for filtering at least one of gases and liquids, comprising:
   a fleece layer,
   a nanofibre layer,
   a cellulose layer,
   wherein the nanofibre layer is a coating of a nanofibre material disposed on the fleece layer,
   wherein the cellulose layer is glued onto the nanofibre layer via an adhesive, and
   wherein the cellulose layer has an impregnation limited to a side facing the nanofibre layer and connected to the adhesive, the impregnation having a composition configured to at least impede the adhesive from penetrating the cellulose layer.

2. The filter material according to claim 1, wherein:
   the adhesive is a water based adhesive, and
   the composition of the impregnation is a silicone based material.

3. The filter material according to claim 1, wherein the nanofibre layer in a thickness direction has at least one of an increasing fibre thickness and an increasing fibre density.

4. The filter material according to claim 3, wherein the at least one of the fibre thickness and the fibre density in the thickness direction increases at least one of continuously and in at least one step.

5. The filter material according to claim 3, wherein the at least one of the fibre thickness and the fibre density increases from the fleece layer to the cellulose layer.

6. The filter material according to claim 1, wherein the filter material is incorporated into a filter body of a filter element, which during the operation of the filter element the filter body is subjected to a through-flow of at least one of a gas and a liquid.

7. The filter element according to claim 6, wherein the filter element is pleated.

8. The filter element according to claim 6, wherein the filter element is at least one of a ring filter element with a ring-shaped filter body and a plate filter element with a plate-shaped filter body.

9. A method for producing a multi-layered, web-shaped filter material, comprising:
   coating a web-shaped fleece layer with a nanofibre material on a side to form a nanofibre layer directly on the fleece layer,
   applying an adhesive onto a web-shaped cellulose layer, and
   joining the cellulose layer and the fleece layer so that the adhesive connects the cellulose layer to the nanofibre layer,
   wherein, prior to applying the adhesive, further including disposing an impregnation into the cellulose layer on at least one side, and wherein the adhesive is applied onto the at least one side of the cellulose layer having the impregnation,
   wherein coating the fleece layer includes electrostatically applying the nanofibre material onto the fleece layer via a fibre dispensing device that includes a conveyor belt and at least two rolls, and wherein the at least two rolls have a different diameter from one another so that a dispensing side of the conveyor belt facing the fleece layer extends at one of an incline and a decline with respect to a horizontal plane.

10. The method according to claim 9, wherein the fibre dispensing device has a spacing between a liquid fibre material and the fleece layer.

11. The method according to claim 10, wherein the spacing at least one of increases and decreases in a movement direction of the fleece layer.

12. The method according to claim 10, further comprising moving the fleece layer past a horizontal and flat surface of the liquid fibre material with an inclination.

13. The method according to claim 9, wherein a plurality of fibre dispensing devices are arranged in a movement direction of the fleece layer one after the other, and wherein a plurality of different spacings are defined between a liquid fibre material and the fleece layer.

14. The method according to claim 10, further comprising adjusting an inclination of the fleece layer with respect to a horizontal plane for altering the spacing.

15. A device for producing a filter material, comprising:
   at least one fibre dispensing device including a conveyor belt with at least two rolls and a tub that is fillable with a liquid fibre material, wherein the conveyor belt at least on a bottom side dips into the tub,
   at least two deflection rollers for guiding a fleece layer above the at least one fibre dispensing device and spaced apart from a top side of the conveyor belt, and
   an ionising device for generating different electrical potentials on the fleece layer and on the at least one fibre dispensing device, such that the liquid fibre material is transported electrostatically from the conveyor belt to the fleece layer during operation,
   wherein the at least two rolls have different diameters from one another and are arranged so that the top side of the conveyor belt extends at an incline with respect to a horizontal plane.

16. The device according to claim 15, wherein a spacing between the fleece layer and the top side of the conveyor belt varies in a direction of movement of the fleece layer.

17. The device according to claim 15, wherein at least one of the at least two deflection rollers is arranged vertically adjustable with respect to the horizontal plane.

18. The device according to claim 15, wherein the at least one fibre dispensing device is arranged vertically adjustable with respect to the horizontal plane.

19. The method according to claim 9, wherein the adhesive includes a water-based adhesive and the impregnation includes a silicone material.

20. The method according to claim 9, wherein the fibre dispensing device has a spacing between the dispensing side of the conveyor belt and the fleece layer; and
   moving the conveyor belt along a movement direction so that a bottom side of the conveyor belt dips into a liquid fibre material and the spacing between the dispensing side and the fleece layer at least one of increases and decreases in the movement direction of the conveyor belt.

* * * * *